United States Patent
Ertle et al.

(10) Patent No.: US 10,969,032 B2
(45) Date of Patent: Apr. 6, 2021

(54) SOLENOID VALVE FOR CONTROLLING THE BRAKING PRESSURE OF A WHEEL BRAKE AND TOOL FOR PRODUCING ITS VALVE ELEMENT

(71) Applicant: Robert Bosch GmbH, Stuttgart (DE)

(72) Inventors: Marcus Ertle, Immenstadt (DE); Klaus Landesfeind, Backnang (DE); Jens Norberg, Stuttgart (DE); Stephan Steingass, Suzhou (CN); Thomas Weitze, Hemmingen (DE); Carsten Bodmann, Ludwigsburg (DE); Edwin Staib, Flein (DE)

(73) Assignee: Robert Bosch GmbH, Stuttgart (DE)

( * ) Notice: Subject to any disclaimer, the term of this patent is extended or adjusted under 35 U.S.C. 154(b) by 83 days.

(21) Appl. No.: 16/342,274

(22) PCT Filed: Sep. 20, 2017

(86) PCT No.: PCT/EP2017/073828
§ 371 (c)(1),
(2) Date: Apr. 16, 2019

(87) PCT Pub. No.: WO2018/072958
PCT Pub. Date: Apr. 26, 2018

(65) Prior Publication Data
US 2019/0322263 A1   Oct. 24, 2019

(30) Foreign Application Priority Data
Oct. 18, 2016  (DE) ..................... 10 2016 220 348.7

(51) Int. Cl.
*F16K 31/06*   (2006.01)
*B60T 13/68*   (2006.01)

(52) U.S. Cl.
CPC ........ *F16K 31/0675* (2013.01); *B60T 13/686* (2013.01); *F16K 31/0665* (2013.01)

(58) Field of Classification Search
CPC .. F16K 31/0675; F16K 31/0665; F16K 27/00; B60T 13/686; B60T 8/36; B60T 8/363; H01F 7/16
See application file for complete search history.

(56) References Cited

U.S. PATENT DOCUMENTS 6,644,623 B1 * 11/2003 Voss ........................ B60T 8/363
251/129.01
2001/0050347 A1   12/2001 Otsuka et al.

FOREIGN PATENT DOCUMENTS

DE              102 53 769 A1   6/2004
DE      10 2004 030 428 A1   1/2006
(Continued)

OTHER PUBLICATIONS

International Search Report corresponding to PCT Application No. PCT/EP2017/073828, dated Nov. 20, 2017 (German and English language document) (8 pages).

*Primary Examiner* — Eric Keasel
(74) *Attorney, Agent, or Firm* — Maginot, Moore & Beck LLP

(57) ABSTRACT

A solenoid valve for controlling the braking pressure of a wheel brake of a slip-controllable hydraulic brake system of a motor vehicle includes an armature, a valve insert, a valve seat, a valve element, and a spring device. The valve element is arranged in the valve insert in a longitudinally displaceable manner and acts together with the valve seat. The spring applies a force acting in the direction of opening with respect to the valve seat to the valve element in the installed position. The valve element can be actuated by an electromagnetic actuator in the closing direction with respect to the valve seat. The valve element is arranged between an anchor (Continued)

and the valve seat and is operatively connected to the anchor. A front face of the valve element facing the anchor has at least one projection and the projection defines a point of contact with the anchor.

12 Claims, 3 Drawing Sheets

(56) References Cited

FOREIGN PATENT DOCUMENTS

| | | |
|---|---|---|
| DE | 10 2007 053 134 A1 | 5/2009 |
| EP | 1 647 460 A1 | 4/2006 |
| EP | 1 752 693 A1 | 2/2007 |
| JP | S54-040519 U | 3/1979 |
| JP | H07-239050 A | 9/1995 |
| JP | 2001-349459 A | 12/2001 |
| JP | 2002-174356 A | 6/2002 |
| JP | 2002-347597 A | 12/2002 |
| JP | 2003-503260 A | 1/2003 |
| JP | 2004-169921 A | 6/2004 |
| JP | 2004-340382 A | 12/2004 |
| JP | 2009-257577 A | 11/2009 |
| JP | 2011-012792 A | 1/2011 |
| JP | 2011-503457 A | 1/2011 |
| JP | 2013-210049 A | 10/2013 |
| WO | 01/00473 A1 | 1/2001 |
| WO | 2009/007277 | 1/2009 |

\* cited by examiner

SOLENOID VALVE FOR CONTROLLING THE BRAKING PRESSURE OF A WHEEL BRAKE AND TOOL FOR PRODUCING ITS VALVE ELEMENT

This application is a 35 U.S.C. § 371 National Stage Application of PCT/EP2017/073828, filed on Sep. 20, 2017, which claims the benefit of priority to Serial No. DE 10 2016 220 348.7, filed on Oct. 18, 2016 in Germany, the disclosures of which are incorporated herein by reference in their entirety.

The disclosure concerns a solenoid valve for controlling the braking pressure of a wheel brake of a slip-controllable hydraulic brake system of a motor vehicle, having a valve element which is arranged at least partially in a valve insert in a longitudinally displaceable manner and cooperates with a valve seat, and which in the installed position is loaded with a force component acting in the opening direction relative to the valve seat by a spring device, and can be actuated by means of an electromagnetic actuator in the closing direction relative to the valve seat, wherein the valve element is arranged between an armature and the valve seat and is operatively connected to the armature, wherein the solenoid valve is characterized in that an end face of the valve element facing the armature has at least one protrusion, wherein the protrusion defines a point of contact with the armature.

BACKGROUND

The prior art includes for example patent application DE 10 2007 053 134 A1. This publication concerns a solenoid valve, in particular for a hydraulic assembly which is used for example in an anti-lock braking system (ABS) or in a traction control system (ASR) or an electronic stability program system (ESP). Such a solenoid valve is shown in FIG. 1. As evident from FIG. 1, the solenoid valve 1—which is configured for example as a normally open control valve—comprises a magnet assembly 3 for producing a magnetic flux, which assembly comprises a housing casing 3.1, a winding carrier 3.2, a coil winding 3.3 and a cover plate 3.4, together with a valve cartridge 2 which comprises an enclosure 2.1, a valve insert 8 inserted with a first end in the enclosure 2.1, a magnet armature 4 with a valve element 6 (also called a plunger) and a return spring 7. On production of the solenoid valve 1, the enclosure 2.1 and the valve insert of the valve cartridge 2 are joined together by pressing, and the valve cartridge 2 is sealed hydraulically against atmosphere by a sealing weld 2.2. In addition, the valve insert 8 absorbs the pressure forces acting in the hydraulic system, and conducts these via a caulking flange 11 to a caulking region 12 of a fluid block 13.

When the coil winding 3.3 is powered via electrical connections 3.5, the magnet assembly 3 generates a magnetic force which moves the longitudinally movable magnet armature 4 with the valve element 6—which comprises a closing element 6.1 with the main sealing element 6.2—onto the valve insert 8 against the force of the return spring 7, wherein the valve element 6 and the return spring 7 are guided in an internal bore of the valve insert 2. The valve insert 8 conducts the magnetic flux, introduced by the magnet assembly 3 via the cover plate 3.4, axially over an air gap 5 in the direction of the magnet armature 4. Also, at a second end, the valve insert 8 receives the valve body 9, which comprises a main valve seat 9.1 in which the main sealing element 6.2 (configured as a sealing cap) plunges in sealed fashion in order to implement the sealing function of the solenoid valve 1. As further evident from FIG. 1, a valve lower part 10 is axially applied to and rests on the valve insert 8, wherein said valve lower part comprises a check valve 10.1 arranged eccentrically relative to the valve main axis. The valve lower part 10, configured for example as a plastic insert, in addition to sealing against the surrounding fluid block 10, also serves to seal against the valve body 9 and to receive a flat filter 10.2.

Moreover, patent application DE 10 2004 030 428 A1 is known from the prior art. This publication concerns an electromagnetic valve device. At least part of the valve element is arranged in a valve chamber delimited by the valve insert in the region of the valve seat. Furthermore, an end of the valve element facing away from the valve chamber is operatively connected to an armature. Here, an end face of the armature facing the valve insert, and or an end face of the valve insert facing the end faces of the armature, is configured with such a surface profile that a flow cross-section delimited by the end faces varies at least in regions in the radial direction and/or in the circumferential direction of the armature.

In general, the plunger and armature components are fitted in the valve without guidance (i.e. with all degrees of freedom). Also, the components are mounted loosely relative to each other and may therefore assume widely varying orientations. The plunger is an injection molding and the armature is a cold-formed steel component. The resulting component precision (in particular at the armature and plunger) has a great influence on the precision of pressure setting. Also, widely varying component orientations between the armature and plunger may lead to fluctuations in pressure setting (as depicted in FIG. 2) since a multiplicity of different constellations between the armature and the plunger is possible, which hence leads to different magnetic forces.

SUMMARY

Advantageously however, the solenoid valve according to the disclosure allows optimization of the contact situation between the armature and the plunger in order to improve the precision of the inlet valve. This is achieved according to the disclosure by the features disclosed herein. Refinements of the disclosure are given in the dependent claims.

The solenoid valve according to the disclosure for controlling the braking pressure of a wheel brake of a slip-controllable hydraulic brake system of a motor vehicle, having a valve element which is arranged at least partially in a valve insert in a longitudinally displaceable manner and cooperates with a valve seat, and which in the installed position is loaded with a force component acting in the opening direction relative to the valve seat by a spring device, and can be actuated by means of an electromagnetic actuator in the closing direction relative to the valve seat, wherein the valve element is arranged between an armature and the valve seat and is operatively connected to the armature, is characterized in that an end face of the valve element facing the armature has at least one protrusion, wherein the protrusion defines a point of contact with the armature.

This means that, by means of the protrusion on the end face of the valve element (also called the plunger), a contact point is defined between the valve element and the armature. The contact between the two components is thereby clearly defined and established. Furthermore, by means of the protrusion as a contact point (and at least one further contact point), a planar contact face for the armature can be created.

This is advantageous in particular if the contact face of the armature stands vertically to the desired or necessary movement direction of the armature and/or valve element. Usually, the valve element is guided tightly and the armature is guided loosely. By means of the design of a corresponding vertical contact face, a tilting of the armature on movement is avoided.

The contact point is formed as a protrusion on the end face. A protrusion is any type of defined structural protuberance. This may for example take the form of a pad (also called a contact pad). For example, the protrusion may be formed as a step. Alternatively, flowing forms and continuous transitions are conceivable. The protrusion may furthermore have a flat plateau face. Alternatively however, another shape may be present. The valve element is in particular injection-molded and fiber-reinforced. The protrusion may be produced during the injection-molding process. To form the protrusion, both an accumulation of material at the site of the protrusion and a depression at other sites are conceivable, so that the protrusion is formed thereby. The tool necessary to produce a valve element is designed accordingly and has corresponding depressions in order to form the protrusion during the injection-molding process. Alternatively, a protrusion may also be formed by a subsequent machining process, for example by means of a material-removal machining process.

It is furthermore pointed out that the armature and valve element are formed as two separate components. Here, the armature is a cold-formed steel component. In this way, by means of the electromagnetic actuator, in particular the armature is activated and operated. The valve element is therefore actuated via the armature in the closing direction, in particular by means of the electromagnetic actuator. The armature activated by the actuator moves, and carries with it the valve element which is operatively connected to the armature. The valve element is here in direct contact with the armature.

The component surface however may have an unevenness due to production for example, which can only be defined to a limited extent in advance. Component inaccuracies may also exist. On reorientation of the components (or rotation during operation), normally a change in contact points occurs and hence a change in accuracy of pressure setting. However, due to the protrusion, a defined contact point may be created. With the solution according to the disclosure, even on reorientation of the components, a constant contact point exists. This ensures a clearly defined contact situation. This leads to a reduction in variation of armature tilting, which in turn causes a reduction in the spread of magnetic force. This solution according to the disclosure thus allows a higher precision of pressure setting of the valve.

It is furthermore advantageous that the protrusion can be formed without additional components. The contact point or points may be produced by simple production methods (e.g. by means of the injection-molding process) and without (further, e.g. material-removal) machining steps.

By providing defined contact points on the valve element (plunger), it can be ensured that the contact situation is more clearly defined. If the height of said contact points is greater than the surface unevenness occurring on the armature (production process), it is also ensured that the contact between the armature and plunger always takes place at these points. In the prior art, because of the unevenness, the contact points may change on reorientation of the components. The resulting fluctuation in armature tilt angle in operation is reduced by the more clearly defined contact situation.

In an advantageous embodiment, the solenoid valve is characterized in that the protrusion is formed as an interrupted ring; or the protrusion is formed as a part region of an annular element; or the protrusion is formed as points.

This means that the protrusion may assume the geometric shape which is suitable for bridging a regional, physical distance between the end face of the valve element and the end face of the armature. This creates a planar contact surface for the armature. This may for example be an annular convexity over a part region of the end face of the valve element. It could also be formed as an applied interrupted ring. Evidently, a protuberance formed as points on the end face is also conceivable. All embodiments share the feature that the protrusion is formed only over a part of the end face (facing the armature).

The described shapes are advantageous for defining a contact point with the armature. Furthermore, the contact situation may thereby be defined more clearly. Also, a suitable contact face may be created for reducing and avoiding armature tilting.

In a possible embodiment, the solenoid valve is characterized in that several protrusions are formed which are positioned in the circumferential direction on the end face of the valve element.

This means that several protrusions are formed. For example, at least two protrusions may be formed. In one embodiment, these protrusions are distributed in the circumferential direction on the end face of the valve element. In an alternative embodiment, the distribution may also form a radial arrangement or a mixed arrangement or star-shaped arrangement. These protrusions define the contact points between the valve element and the armature. This contact points create a clear contact situation and avoid tilting of the armature. The remaining part of the end face of the valve element however does not come into contact with the armature. Advantageously, this may allow a distribution of the force application. Also, the positioning of the protrusions on the end face can be achieved in a simple fashion with reduced additional production costs (e.g. during production of the tool for the injection molding).

In a preferred embodiment, the solenoid valve is characterized in that several protrusions are formed which are positioned radially at the same distance from the central axis of the valve element.

This means that the protrusions are arranged substantially at the same distance from the central axis of the valve element. Advantageously, thereby a clear contact situation can be created and tilting of the armature can be reduced to a specific side and largely avoided. Also, a more even force flow results.

In an alternative embodiment, the solenoid valve is characterized in that several protrusions are formed which are arranged spaced apart from each other circumferentially on the end face of the valve element.

This means that several protrusions are present. These may for example be configured as parts of an annular protuberance on the end face. The respective parts (protrusions) do not however overlap but are spaced apart from each other around the circumference. Advantageously, this improves the contact situation. This allows a more uniform precision of pressure setting.

In an advantageous embodiment, the solenoid valve is characterized in that several protrusions are formed, wherein these are positioned on the end face of the valve element, symmetrically distributed relative to the central axis.

This means that the several protrusions have for example the same distance from the central axis, and the distance between two adjacent protrusions is the same. Preferably, the protrusions are distributed evenly. The protrusions may also have the same depths (e.g. 0.35 mm) and widths (e.g. 0.75 mm). Advantageously, this allows a clear contact situation. This furthermore allows an even force flow and prevents tilting of the armature.

In a possible embodiment, the solenoid valve is characterized in that several protrusions are formed, wherein these are positioned on the outer edge of the end face of the valve element.

This means that the protrusions are positioned such that they have the greatest possible distance from the central axis. Here, advantageously, a tilting of the armature on movement can be reduced or avoided.

In a preferred refinement, the solenoid valve is characterized in that three protrusions are formed.

This means that precisely three protrusions are defined on the end face of the valve element. By defining this number, it is possible to avoid redundancy of the contact situation. This prevents "wobbling" of the armature because of the geometric redundancy.

In an alternative embodiment however, four or five protrusions are also conceivable.

In an alternative embodiment, the solenoid valve is characterized in that one protrusion is formed on each fin of the valve element.

This means that the valve element contains axial openings which for example positively influence the fluid flow, and fins of the valve element remain between the openings to allow radial guidance. For example, four fins may be provided. By positioning the contact points on the fins, a suitable spacing of the contact points from the central axis may be set. Advantageously, thereby the contact situation can be optimized within the existing structure and geometry of the valve element. This allows the advantages described (in particular reduction in/avoidance of tilting of the armature, and defined contact situation) without changing the present fundamental design of the valve element.

In an advantageous embodiment, the solenoid valve is characterized in that the height of the protrusions is dimensioned such that these compensate for a defined surface unevenness, in particular a defined surface unevenness and an additional safety allowance.

This means that during the production process, surface unevenness may also occur at the armature or valve element. This may be taken into account and compensated by a correspondingly defined height of the protrusions. This may ensure that the contact between the armature and the valve element occurs at the defined contact points (and not at the poorly defined unevenness). The corresponding surface unevenness and the corresponding height of the protrusions may be determined for example of the basis of measurement values or simulations. For example, the height of a protrusion is approximately between 0.025 mm and 0.075 mm, for example 0.0365 mm or 0.0499 mm. Advantageously, this ensures a clear contact situation both in the case of regular unevenness and in unusual circumstances, e.g. workpieces with limited incorrect dimensions.

In a possible embodiment, the solenoid valve is characterized in that the area of the protrusion is dimensioned such that this is as small as possible and guarantees a permanent resistance to the force-loaded application of the valve element on the armature.

This means that the total surface pressure is distributed over the areas of the contact points which are in contact. The area or sum of the areas of the defined contact points is therefore designed such that a defined surface pressure can be transmitted. Such a force-loaded application of the valve element to the armature results both because of the spring force in the rest position and because of the spring force and actuator force on movement. Furthermore, the area is defined such that this is as small as possible. Thus the risk can be reduced that the respective contact point will coincide with an unevenness, for example on the armature end face.

According to the disclosure, furthermore a tool is provided for producing a valve element for a solenoid valve for controlling the braking pressure of a wheel brake of a slip-controllable hydraulic brake system of a motor vehicle, wherein the valve element is arranged at least partially in a valve insert in a longitudinally displaceable manner and can cooperate with a valve seat, and wherein in the installed position, the valve element can be loaded with a force component acting in the opening direction relative to the valve seat by a spring device, and can be actuated by means of an electromagnetic actuator in the closing direction relative to the valve seat, wherein the valve element can be arranged between an armature and the valve seat and wherein the valve element is operatively connected to the armature, characterized in that the tool is configured to form the valve element such that an end face of the valve element facing the armature has at least one protrusion, wherein the protrusion defines a point of contact with the armature.

This means a tool which is configured and designed to produce a valve element as described above. The tool may for example be an injection mold for production of the valve element. This injection mold may for example have openings for creating protrusions on the end face of the valve element.

BRIEF DESCRIPTION OF THE DRAWINGS

It is pointed out that the features listed individually in the description may be combined with each other in any technically sensible fashion and disclose further embodiments of the disclosure. Further features and suitabilities of the disclosure result from the description of exemplary embodiments with reference to the attached figures.

The Drawings Show.

DETAILED DESCRIPTION

Figure 1:
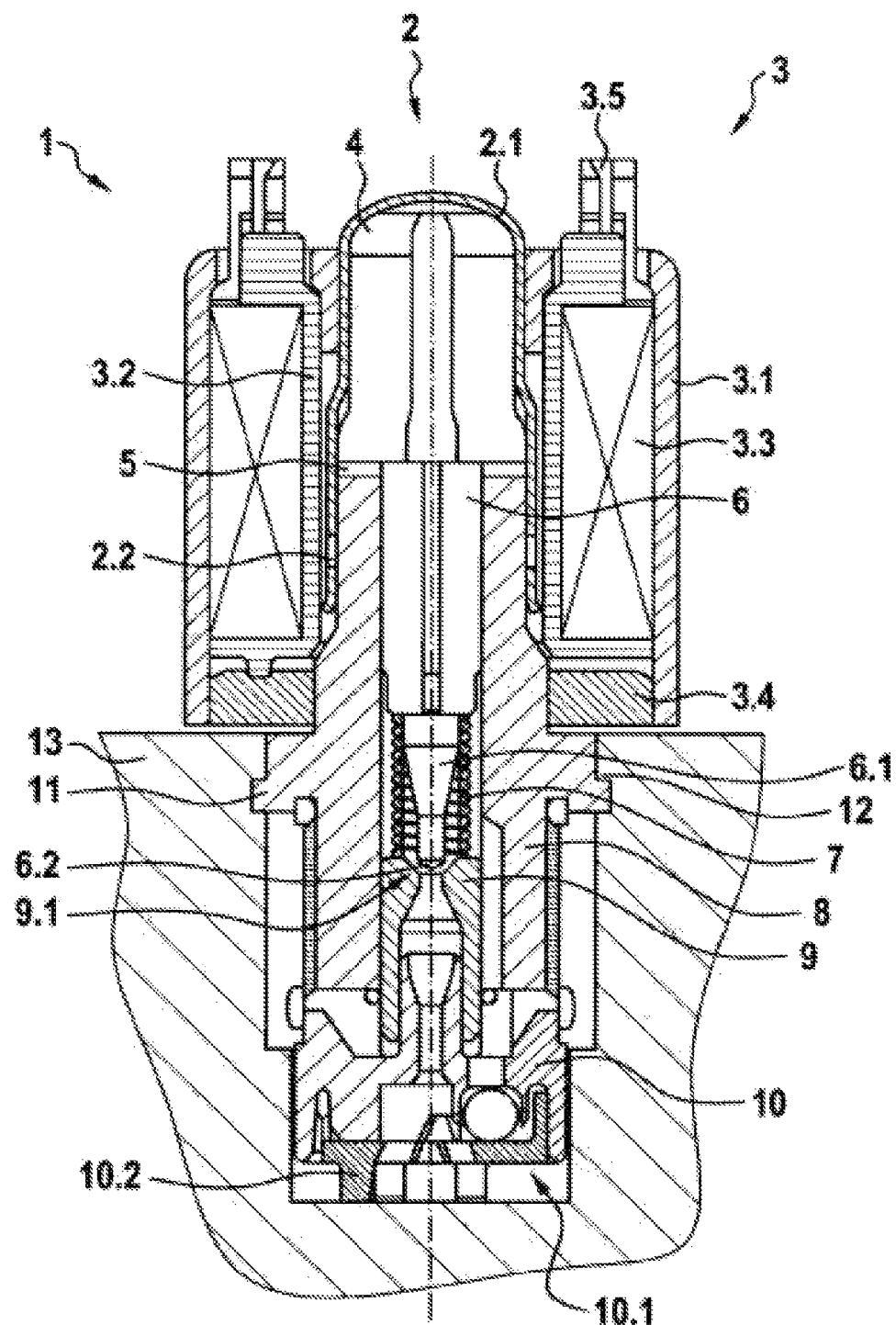
FIG. 1 a diagrammatic sectional view of a conventional solenoid valve.

FIG. 1 shows a diagrammatic sectional view of a conventional solenoid valve. This has already been described as the prior art.

Figure 2:
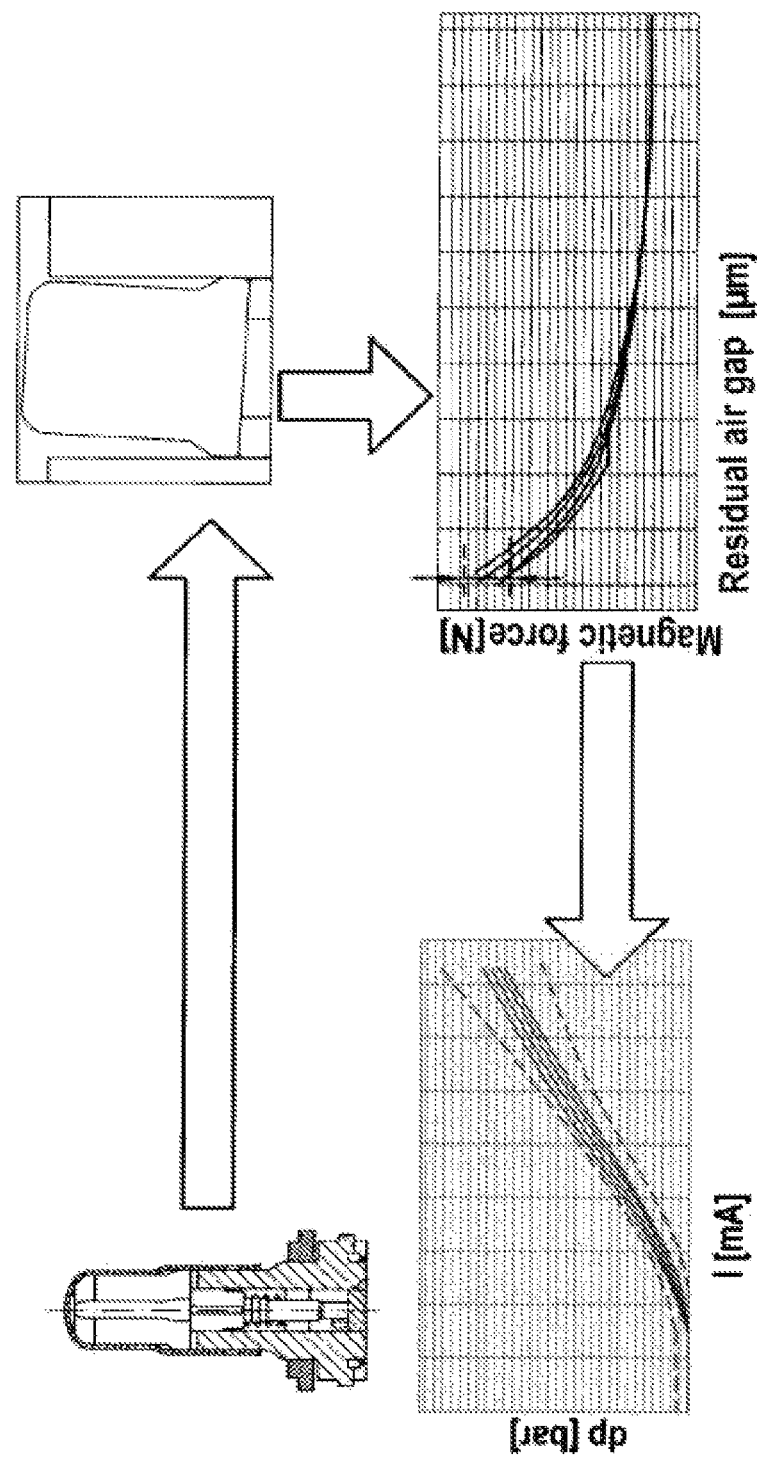
FIG. 2 a diagrammatic cause-and-effect chain with regard to the accuracy of pressure setting and the armature tilt angle.

FIG. 2 furthermore shows diagrammatically a cause-and-effect chain. In the depictions, the top left shows possible inaccuracies in the individual components. Such inaccuracies may lead to tilting, e.g. an oblique positioning of the armature relative to the valve insert for example. This is shown at the top right of the depiction. On use of the valve, furthermore the armature and/or valve element may rotate. This again leads to a varying oblique positioning of the armature e.g. relative to the valve insert. Varying oblique positions of the armature however cause a variation in the magnetic force acting on the armature. This is shown at the bottom right of the depiction. The varying magnetic force acting on the armature in turn leads to a different current/pressure characteristic of the valve, as shown in the bottom left in the depiction. Simple unevennesses in the components thus lead to different performance characteristics for different valves—and different characteristics are produced in one and the same valve during operation of the valve.

Figure 3A:
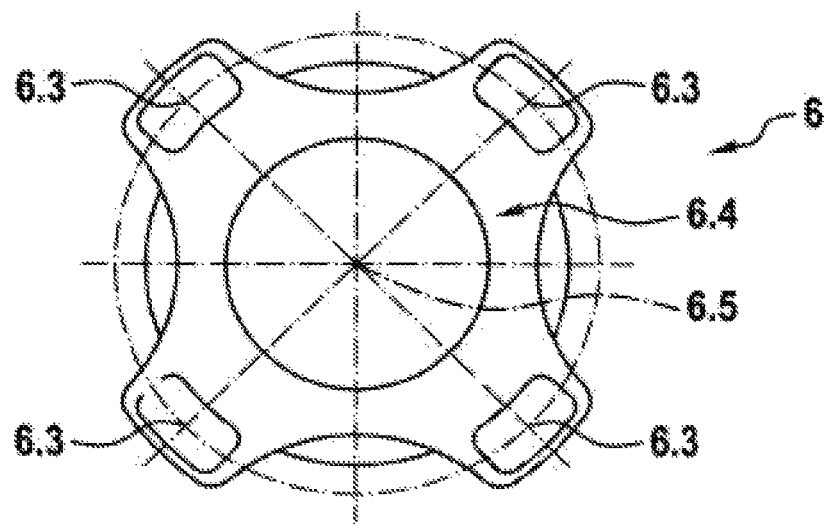
FIG. 3a a diagrammatic view from the top of an exemplary embodiment of a valve element with formed contact points, and FIG. 3b a diagrammatic view from the side of an exemplary embodiment of the valve element with formed contact points.
Figure 3B:
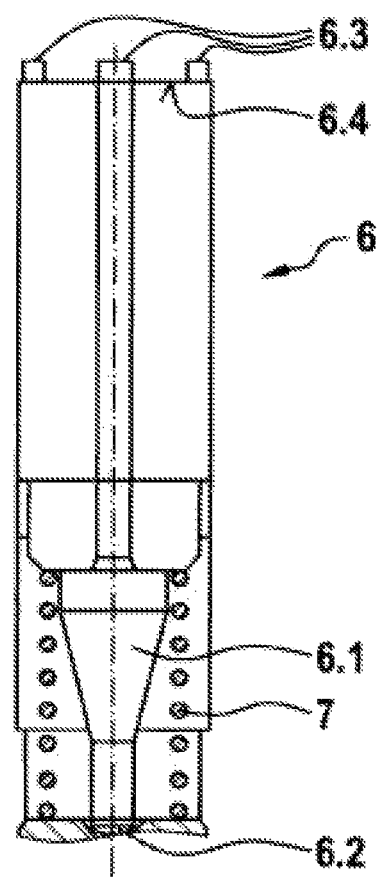

FIGS. 3a and 3b show embodiments to solve the problem. FIG. 3a shows, in a direct top view, defined contact points 6.3 on the end face of the valve element 6. The contact points 6.3 are defined and formed on the end face 6.4 of the valve element 6 pointing towards the armature 4. One contact point 6.3 is made on each fin of the valve element 6. The contact points 6.3 are positioned on the outer edge of the end face 6.4 but slightly set back from the outer edge. The contact points 6.3 are longer in the circumferential direction than in the radial direction. The radial edges of the contact points 6.3 are oriented towards the central axis 6.5 of the valve element 6.

FIG. 3b shows the exemplary embodiment in a side view. The valve element 6 is also depicted. It is clear here that the contact points 6.3 are formed on the end face 6.4 of the valve element 6 facing the armature 4. Furthermore, the spacing of the contact points 6.3 is also shown. The depicted height of the contact points 6.3 serves for better identification. Furthermore, the closing element 6.1, the main sealing element 6.2 and the spring device 7 are also depicted.

The invention claimed is:

1. A solenoid valve for controlling a braking pressure of a wheel brake of a slip-controllable hydraulic brake system of a motor vehicle, comprising:
   an armature;
   a valve insert;
   a valve seat;
   a valve element arranged at least partially in the valve insert in a longitudinally displaceable manner and configured to cooperate with the valve seat, the valve element arranged between the armature and the valve seat, configured to be actuated by an electromagnetic actuator in a closing direction relative to the valve seat, and operatively connected to the armature; and
   a spring device configured to load the valve element with a force component acting in an opening direction relative to the valve seat when the valve element is in an installed position,
   wherein the valve element includes a plurality of protrusions that protrude from an end face of the valve element facing the armature,
   wherein each protrusion of the plurality of protrusions defines a point of contact with the armature, and
   wherein a height of each protrusion is based on a surface unevenness of at least one of the armature and the end face such that the plurality of protrusions compensates for the surface unevenness.

2. The solenoid valve as claimed in claim 1, wherein:
   the plurality of protrusions are configured as an interrupted ring; or
   the plurality of protrusions are configured as part regions of an annular element; or
   the plurality of protrusions are configured as a plurality of points.

3. The solenoid valve as claimed in claim 1, wherein the plurality of protrusions are positioned in a circumferential direction on the end face of the valve element.

4. The solenoid valve as claimed in claim 1, wherein each protrusion of the plurality of protrusions is positioned radially at the same distance from a central axis of the valve element.

5. The solenoid valve as claimed in claim 1, wherein the plurality of protrusions are arranged spaced apart from each other circumferentially on the end face of the valve element.

6. The solenoid valve as claimed in claim 1, wherein the plurality of protrusions are positioned on the end face of the valve element and are distributed symmetrically relative to the central axis.

7. The solenoid valve as claimed in claim 1, wherein the plurality of protrusions are positioned on an outer radial edge of the end face of the valve element.

8. The solenoid valve as claimed in claim 1, wherein the plurality of protrusions includes precisely three protrusions.

9. The solenoid valve as claimed in claim 1, wherein the plurality of protrusions are configured such that an overall area of the plurality of protrusions is a minimum area that guarantees a permanent resistance to a force-loaded application of the valve element on the armature.

10. The solenoid valve as claimed in claim 1, wherein the height of each protrusion is a base height value that is adjusted so as to compensate for the surface unevenness.

11. A solenoid valve for controlling a braking pressure of a wheel brake of a slip-controllable hydraulic brake system of a motor vehicle, comprising:
    an armature;
    a valve insert;
    a valve seat;
    a valve element arranged at least partially in the valve insert in a longitudinally displaceable manner and configured to cooperate with the valve seat, the valve element arranged between the armature and the valve seat, configured to be actuated by an electromagnetic actuator in a closing direction relative to the valve seat, and operatively connected to the armature; and
    a spring device configured to load the valve element with a force component acting in an opening direction relative to the valve seat when the valve element is in an installed position,
    wherein:
       an end face of the valve element facing the armature includes at least one protrusion;
       the at least one protrusion defines a point of contact with the armature;
       the valve element includes a plurality of fins; and
       one protrusion of the at least one protrusion is arranged on each fin of the plurality of fins.

12. The solenoid valve as claimed in claim 11, wherein a height of each protrusion of the at least one protrusion is based on a surface unevenness of at least one of the armature and the end face such that the plurality of protrusions compensates for the surface unevenness.

* * * * *